United States Patent
Lee et al.

(10) Patent No.: US 12,119,476 B2
(45) Date of Patent: Oct. 15, 2024

(54) SECONDARY BATTERY ELECTRODE INCLUDING MIXTURE LAYER OF DOUBLE LAYER STRUCTURE CONTAINING ACTIVE MATERIALS OF DIFFERENT PARTICLE DIAMETERS, AND METHOD FOR MANUFACTURING THE SAME

(71) Applicant: LG CHEM, LTD., Seoul (KR)

(72) Inventors: Dae Jin Lee, Daejeon (KR); Dong Hwi Kim, Daejeon (KR); Jin Tae Hwang, Daejeon (KR); Hyeong Il Kim, Daejeon (KR); Seul Ki Chae, Daejeon (KR); Wang Mo Jung, Daejeon (KR); Dong Hun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 670 days.

(21) Appl. No.: 17/278,233

(22) PCT Filed: Jul. 29, 2020

(86) PCT No.: PCT/KR2020/009990
§ 371 (c)(1),
(2) Date: Mar. 19, 2021

(87) PCT Pub. No.: WO2021/096025
PCT Pub. Date: May 20, 2021

(65) Prior Publication Data
US 2022/0310984 A1  Sep. 29, 2022

(30) Foreign Application Priority Data
Nov. 14, 2019 (KR) .................. 10-2019-0145833

(51) Int. Cl.
*H01M 4/02* (2006.01)
*H01M 4/04* (2006.01)
(Continued)

(52) U.S. Cl.
CPC ....... *H01M 4/0404* (2013.01); *H01M 4/0435* (2013.01); *H01M 4/131* (2013.01);
(Continued)

(58) Field of Classification Search
None
See application file for complete search history.

(56) References Cited

U.S. PATENT DOCUMENTS

2014/0370337 A1\* 12/2014 Matsui .................. H01M 4/485
429/61
2017/0256776 A1   9/2017 Saka et al.
(Continued)

FOREIGN PATENT DOCUMENTS

CN   104205425 A   12/2014
CN   106663774 A   5/2017
(Continued)

OTHER PUBLICATIONS

Office Action issued in corresponding Japanese Patent Application No. 2021-516880 dated Apr. 18, 2022.
(Continued)

*Primary Examiner* — Tracy M Dove
(74) *Attorney, Agent, or Firm* — Morgan, Lewis & Bockius LLP (57) ABSTRACT

The present invention relates to an electrode of a double-layer structure including a different type of particulate active material having a different average particle diameter, and a secondary battery including the same, and according to the present invention, the mechanical strength and stability of the electrode increases, and the secondary battery to which they are applied exhibits excellent discharge capacity.

19 Claims, 4 Drawing Sheets

(51) Int. Cl.
*H01M 4/131* (2010.01)
*H01M 4/62* (2006.01)
*H01M 10/052* (2010.01)

(52) U.S. Cl.
CPC ......... *H01M 4/623* (2013.01); *H01M 10/052* (2013.01); *H01M 2004/028* (2013.01)

(56) References Cited

U.S. PATENT DOCUMENTS

| | | | | |
|---|---|---|---|---|
| 2018/0287202 | A1* | 10/2018 | Matsushita | H01M 4/366 |
| 2020/0020937 | A1* | 1/2020 | Yao | H01M 4/366 |

FOREIGN PATENT DOCUMENTS

| | | | |
|---|---|---|---|
| CN | 110431695 | A | 11/2019 |
| JP | 2002-216749 | A | 8/2002 |
| JP | 2006-210003 | A | 8/2006 |
| JP | 2008-293875 | A | 12/2008 |
| JP | 2010-092622 | A | 4/2010 |
| JP | 2010-135272 | A | 6/2010 |
| JP | 2012-146395 | A | 8/2012 |
| JP | 2014-522549 | A | 9/2014 |
| JP | 2015-002065 | A | 1/2015 |
| JP | 2015-510249 | A | 4/2015 |
| JP | 2015-088385 | A | 5/2015 |
| JP | 2015-88385 | A | 5/2015 |
| JP | 6136612 | B2 | 5/2017 |
| JP | 2017-130476 | A | 7/2017 |
| JP | 6167854 | B2 | 7/2017 |
| JP | 2017-157529 | A | 9/2017 |
| JP | 2018-060735 | A | 4/2018 |
| JP | 2020-095853 | A | 6/2020 |
| KR | 10-2013-0117718 | A | 10/2013 |
| KR | 10-2015-0016018 | A | 2/2015 |
| KR | 10-1545866 | B1 | 8/2015 |
| KR | 10-1613285 | B1 | 4/2016 |
| KR | 10-2017-0103184 | A | 9/2017 |
| KR | 10-2018-0090018 | A | 8/2018 |
| KR | 10-2018-0122238 | A | 11/2018 |
| KR | 2018-0118913 | A | 11/2018 |
| KR | 10-2019-0058367 | A | 5/2019 |
| KR | 10-2019-0078498 | A | 7/2019 |
| WO | 2019/177403 | A1 | 9/2019 |

OTHER PUBLICATIONS

International Search Report issued in corresponding International Patent Application No. PCT/KR2020/009990 issued dated Nov. 3, 2020.

Written Opinion issued in corresponding International Patent Application No. PCT/KR2020/009990 issued dated Nov. 3, 2020.

International Search Report dated Nov. 3, 2020 issued in corresponding International Patent Application No. PCT/KR2020/009990.

Extended European Search Report dated Nov. 25, 2021 issued by the European Patent Office in corresponding European patent application No. 20862001.3.

* cited by examiner

SECONDARY BATTERY ELECTRODE INCLUDING MIXTURE LAYER OF DOUBLE LAYER STRUCTURE CONTAINING ACTIVE MATERIALS OF DIFFERENT PARTICLE DIAMETERS, AND METHOD FOR MANUFACTURING THE SAME

TECHNICAL FIELD

This application claims the benefit of priority based on Korean Patent Application No. 10-2019-0145833, filed on Nov. 14, 2019, and the entire contents of the Korean patent application are incorporated herein by reference.

The present invention relates to a secondary battery electrode including a mixture layer of a double layer structure containing active materials of different particle diameters, and a method for manufacturing the same.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel. In order to be applied as an energy source of an electric vehicle, a high-power battery is required.

The development of an electrode having a high energy density is attracting attention as a way to increase the output characteristics of a secondary battery. For example, particles having a large particle diameter are applied as a positive electrode active material, and a thinner metal thin film is applied as a current collector to reduce the volume. However, if the particle diameter of the active material is increased and the thickness of the current collector is reduced, the current collector is damaged or severely disconnected in the process of rolling the electrode.

Accordingly, there is a need to develop an electrode having a new structure capable of enhancing the output characteristics of the battery without impairing the stability of the battery.

DISCLOSURE

Technical Problem

The present invention has been invented to solve the above problems, and an object of the present invention is to provide an electrode for a secondary battery, including a buffer layer, and a method of manufacturing the same.

Technical Solution

An electrode for a secondary battery according to the present invention includes: a current collector layer; a lower mixture layer formed on one or both surfaces of the current collector layer and including a particulate active material; and an upper mixture layer formed on an opposite surface of a surface where the lower mixture layer comes in contact with the current collector layer, and including a particulate active material. In one example, the upper mixture layer includes active material particles having a first particle size range and active material particles having a third particle size range, and the lower mixture layer includes active material particles having a second particle size range and active material particles having a third particle size range. In addition, the electrode for a secondary battery satisfies the following conditions 1 and 2.

$$D1 > D2 > D3 \quad \text{[Condition 1]}$$

$$D1 - D3 \geq 5 \; (\mu m) \quad \text{[Condition 2]}$$

In the conditions 1 and 2,

D1 is an average particle diameter of the active material particles having the first particle diameter range, D2 is an average particle diameter of the active material particles having the second particle diameter range, and D3 is an average particle diameter of the active material particles having the third particle diameter range.

In a specific example, an average particle diameter of the active material particles having the first particle diameter range is in a range of 14 to 20 μm, an average particle diameter of the active material particles having the second particle diameter range is in a range of 10 to 13 μm, and an average particle diameter of the active material particles having the third particle diameter range is in a range of 3 to 9 μm.

In one example, in the upper mixture layer, the content ratio of the active material particles having the first particle size range and the active material particles having the third particle size range is in the range of 6:4 to 9:1 by weight.

In another example, in the lower mixture layer, the content ratio of the active material particles having the second particle size range and the active material particles having the third particle size range is in the range of 6:4 to 9:1 by weight.

In one example, a buffer layer interposed between the current collector layer and the lower mixture layer may be further included, and the buffer layer may include niobium-containing oxide. In a specific example, the oxide containing niobium contained in the buffer layer includes at least one of $Li_3NbO_4$, $LiNbO$, and $Nb_2O_5$. For example, the average thickness of the buffer layer is in the range of 1 to 10 μm.

In a specific embodiment, the current collector layer is formed of a metal foil having an average thickness of 10 to 20 μm.

In another specific example, the electrode is an electrode for a lithium secondary battery.

In addition, the present invention provides a method of manufacturing an electrode for a secondary battery described above. In one example, the method includes: a step of forming a lower mixture layer including active material particles having a second particle size range and active material particles having a third particle size range on one or both sides of a current collector layer; a step of forming an upper mixture layer including active material particles having a first particle diameter range and active material particles having the third particle diameter range on the lower mixture layer; and a step of rolling the electrode on which the lower and upper mixture layers are applied. Further, the method satisfies the following conditions 1 and 2.

$$D1 > D2 > D3 \quad \text{[Condition 1]}$$

$$D1 - D3 \geq 5 \; (\mu m) \quad \text{[Condition 2]}$$

In the conditions 1 and 2,

D1 is an average particle diameter of the active material particles having the first particle diameter range, D2 is an average particle diameter of the active material particles having the second particle diameter range, and D3 is an average particle diameter of the active material particles having the third particle diameter range.

In one example, the porosity of the mixture layer subjected to the rolling step is in the range of 20 to 30% (v/v).

In another example, the thickness ratio of the lower mixture layer and the upper mixture layer is in the range of 1:9 to 4:6.

In a specific embodiment, the current collector layer is formed of a metal foil having an average thickness of 10 to 20 μm.

In another example, the method of manufacturing an electrode for a secondary battery according to the present invention further includes forming a buffer layer including an oxide containing niobium on the current collector before forming the lower mixture layer.

Advantageous Effects

The electrode for a secondary battery and a method for manufacturing the same according to the present invention can minimize damage to the current collector layer during the pressure of the electrode and provide a secondary battery having a high energy density.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides an electrode for a secondary battery. In one embodiment, the electrode for the secondary battery includes: a current collector layer; a lower mixture layer formed on one or both surfaces of the current collector layer and including a particulate active material; and an upper mixture layer formed on an opposite surface of a surface where the lower mixture layer comes in contact with the current collector layer, and including a particulate active material. The upper mixture layer includes active material particles having a first particle size range and active material particles having a third particle size range, and the lower mixture layer includes active material particles having a second particle size range and active material particles having a third particle size range. In addition, the electrode for a secondary battery according to the present invention satisfies the following conditions 1 and 2.

$$D1 > D2 > D3 \qquad \text{[Condition 1]}$$

$$D1 - D3 \geq 5 \; (\mu m) \qquad \text{[Condition 2]}$$

In conditions 1 and 2 above,

D1 is the average particle diameter of active material particles having a first particle diameter range, D2 is the average particle diameter of active material particles having a second particle diameter range, and D3 is the average particle diameter of active material particles having a third particle diameter range.

The present invention has a structure including a large particle active material having a large average particle diameter and a small particle active material having a small average particle diameter in an upper mixture layer. In addition, the present invention has a structure including a medium particle active material having a medium average particle diameter and a small particle active material having a small average particle diameter in the lower mixture layer.

Specifically, the upper mixture layer includes active material particles having a first particle size range and active material particles having a third particle size range, and the lower mixture layer includes active material particles having a second particle size range and active material particles having a third particle size range. The active material particles having the first particle size range correspond to the large particle active material, the active material particles having the second particle size correspond to the medium particle active material, and the active material particles having the third particle size correspond to the small particle active material.

In one embodiment, the average particle diameter of the active material particles having the first particle diameter range is in the range of 14 to 20 μm, and specifically in the range of 14 to 18 μm or 15 to 16 μm. The average particle diameter of the active material particles having the second particle diameter range is in the range of 10 to 13 μm, and specifically in the range of 10 to 12 μm. In addition, the average particle diameter of the active material particles having the third particle size range is in the range of 3 to 9 μm, and specifically in the range of 5 to 9 μm or 6 to 8 μm.

In the present invention, the energy density of the electrode can be increased by mixing the large particle active material and the small particle active material in the upper mixture layer. This is larger than the range of particle diameters classified by conventional large particles. In the present invention, in order to increase the energy density of the battery, a large particle active material having an average particle diameter of 14 μm or more and a metal thin film having a thickness of 20 μm or less are used as the current collector. Large particle active materials with an average particle diameter of 14 μm or more are applied to the mixture layer, and during the rolling process of the electrode, a particle sticking phenomenon may occur, resulting in a disconnection, or a problem, in which stress is concentrated between the non-coated part and the coated part, may be generated. However, if the particle diameter of the active material is increased and the thickness of the current collector is reduced, the current collector is damaged or severely disconnected in the process of rolling the electrode. This problem becomes more severe when a current collector with a thin thickness is applied, and it is not solved even if some small particles having a small particle diameter are mixed.

In contrast, in the present invention, a structure in which a medium particle active material and a small particle active material are mixed is introduced in the lower mixture layer. The medium particle active material has a smaller radius of curvature of the particles compared to the large particle active material, so it can reduce damage to the current collector during the rolling process. Further, since the number of contacts with the small particle active material located around the medium particle active material is large, the line pressure can be dispersed during the rolling process.

In one embodiment, in the upper mixture layer, the content ratio of the active material particles having the first particle size range and the active material particles having the third particle size range is in the range of 6:4 to 9:1 by weight. Specifically, in the upper mixture layer, the content ratio of the active material particles having the first particle size range and the active material particles having the third particle size range is in the range of 7:3 to 8:2 by weight. By controlling the content of the active material particles having the first and third particle diameters in the above range in the upper mixture layer, high energy density can be achieved while maintaining the mechanical strength of the electrode.

In another embodiment, in the lower mixture layer, the content ratio of the active material particles having the second particle size range and the active material particles having the third particle size range is in the range of 6:4 to 9:1 by weight. Specifically, in the lower mixture layer, the content ratio of the active material particles having the second particle size range and the active material particles having the third particle size range is in the range of 7:3 to 8:2 by weight.

By controlling the content of the active material particles having the second and third particle diameters in the lower mixture layer within the above range, it is possible to minimize the current collector's entanglement by the active material during the rolling process without impairing the energy density of the electrode.

In one embodiment, a buffer layer interposed between the current collector layer and the lower mixture layer may be further included, and the buffer layer may include niobium-containing oxide. In the present invention, by forming a buffer layer between the current collector layer and the mixture layer, damage to the current collector layer can be minimized despite high rolling strength.

In a specific embodiment, the oxide containing niobium contained in the buffer layer includes at least one of $Li_3NbO_4$, $LiNbO$, and $Nb_2O_5$. The niobium-containing oxide has excellent ion conductivity and electronic conductivity, and does not impair electrode characteristics even when the buffer layer is formed therethrough.

In the present invention, by forming a buffer layer containing an oxide containing niobium, the current collector layer is prevented from being damaged in the process of rolling the electrode to which the mixture layer is applied. In addition to the niobium-containing oxide, the buffer layer includes a binder and a conductive material applied to the mixture layer. In order to increase the energy density of the electrode, in addition to increasing the particle size of the active material, there is a method of increasing the density by increasing the rolling strength of the mixture layer. However, when an active material having a large particle diameter is applied to the mixture layer and the rolling strength is increased, a shape in which the active material particles are stuck in the current collector layer occurs during the rolling of the mixture layer, which leads to damage to the current collector layer. When the current collector layer is severely damaged, the current collector layer may be torn or disconnected. In a specific embodiment, the average thickness of the buffer layer is in the range of 1 to 10 μm. For example, the average thickness of the buffer layer is in the range of 3 to 5 μm. By controlling the thickness of the buffer layer within the above range, it is possible to achieve a protective effect for the current collector layer while minimizing a decrease in capacity due to the formation of the buffer layer.

In one embodiment, the current collector layer is formed of a metal foil having an average thickness of 10 to 20 μm. Specifically, the average thickness of the current collector layer is in the range of 15 to 20 μm or 10 to 18 μm. For example, the current collector layer is formed of aluminum (Al) foil. In order to increase the energy density of the battery, the thickness of the current collector layer applied to the electrode is formed to be thin. However, when the thickness of the current collector layer becomes thin, there is a problem that the current collector layer is damaged during the rolling process after forming the mixture layer. In particular, as the particle diameter of the active material included in the mixture layer increases, the likelihood of damage to the current collector layer in the rolling process increases.

In one embodiment, the electrode is an electrode for a lithium secondary battery. Specifically, the electrode is a positive electrode for a lithium secondary battery. The lithium secondary battery includes, for example, an electrode assembly including a positive electrode, a negative electrode, and a separator interposed between the positive electrode and the negative electrode; a non-aqueous electrolyte impregnating the electrode assembly; and a battery case containing the electrode assembly and the non-aqueous electrolyte.

The positive electrode has a structure in which a positive electrode mixture layer is stacked on one or both sides of a positive electrode current collector. The positive electrode active materials may each independently be a lithium-containing oxide, and may be the same or different. A lithium-containing transition metal oxide may be used as the lithium-containing oxide. In one example, the positive electrode mixture layer includes a conductive material and a binder polymer in addition to the positive electrode active material, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2(0.5<x<1.3)$, $Li_xNiO_2$ $(0.5<x<1.3)$, $Li_xMnO_2(0.5<x<1.3)$, $Li_xMn_2O_4(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2$ $(0.5<x<1.3, 0≤y<1)$, $Li_xNi_{1-y}Mn_yO_2(0.5<x<1.3, 0≤y<1)$, $Li_x(Ni_aCo_bMn_c)O_4(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}Co_zO_4$ $(0.5<x<1.3, 0<z<2)$, $Li_xCoPO_4(0.5<x<1.3)$ and $Li_xFePO4$ $(0.5<x<1.3)$. In addition, the lithium-containing transition metal oxide may be coated with a metal such as aluminum (Al) or a metal oxide. Further, in addition to the lithium-containing transition metal oxide, one or more of sulfide, selenide, and halide may be used.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof. Specifically, the current collector for the positive electrode is formed of metal components described above, and includes a metal plate having a through hole in the thickness direction, and an ion conductive porous reinforcing material filled in the through hole of the metal plate.

The negative electrode may further include a negative electrode mixture layer, and may include a carbon material, lithium metal, silicon, or tin. When a carbon material is used as the negative electrode active material, both low crystalline carbon and high crystalline carbon may be used. Representative examples of low crystalline carbon include soft carbon and hard carbon are typical. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials. Specifically, the current collector for the negative electrode is formed of metal components described above, and includes a metal plate having a through hole in the thickness direction, and an ion conductive porous reinforcing material filled in the through hole of the metal plate.

In addition, the negative electrode may include a conductive material and a binder commonly used in the art.

The separator may be made of any porous substrate used in a lithium secondary battery, and for example, a polyolefin-based porous membrane or a nonwoven fabric may be used, but the present invention is not particularly limited thereto. Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

According to an embodiment of the present invention, the electrolyte may be a non-aqueous electrolyte. Examples of the non-aqueous electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc. However, it is not particularly limited thereto, and a number of electrolyte components commonly used in the field of lithium secondary batteries may be added or subtracted within an appropriate range.

In addition, the present invention provides a vehicle or large-capacity energy storage device including the secondary battery described above. In a specific example, the vehicle is a hybrid or electric vehicle.

The present invention also provides a method of manufacturing an electrode for a secondary battery described above. In one embodiment, the method of manufacturing an electrode for a secondary battery according to the present invention includes: a step of forming a lower mixture layer including active material particles having a second particle size range and active material particles having a third particle size range on one or both sides of a current collector layer; a step of forming an upper mixture layer including active material particles having a first particle diameter range and active material particles having the third particle diameter range on the lower mixture layer; and a step of rolling the electrode on which the lower and upper mixture layers are applied. In addition, the method of manufacturing an electrode for a secondary battery according to the present invention satisfies the following conditions 1 and 2.

$$D1 > D2 > D3 \qquad \text{[Condition 1]}$$

$$D1 - D3 \geq 5 \, (\mu m) \qquad \text{[Condition 2]}$$

In conditions 1 and 2 above,

D1 is the average particle diameter of active material particles having a first particle diameter range, D2 is the average particle diameter of active material particles having a second particle diameter range, and D3 is the average particle diameter of active material particles having a third particle diameter range.

In the present invention, the description of each component is duplicated with that described above, and a description of the duplicated portion is omitted. In the method of manufacturing an electrode for a secondary battery, lower and upper mixture layers are sequentially formed on a current collector. After the step of applying the mixture layer, a drying process may be performed.

After the step of applying the mixture layer, a drying process may be performed. In addition, in the above manufacturing method, the electrode that has undergone a drying process is subjected to a step of rolling while the mixture layer is applied. Through the rolling step, it is possible to reduce the volume of the mixture layer and increase the density of the active material.

In one embodiment, the mixture layer subjected to the rolling step has a porosity in the range of 20 to 30% (v/v). Specifically, the porosity of the mixture layer subjected to the rolling step is in the range of 23 to 25% (v/v). In the method of manufacturing an electrode for a secondary battery according to the present invention, by controlling the porosity range of the mixture layer to the above range, high energy density can be realized without impairing electrode characteristics.

In one embodiment, the thickness ratio of the lower mixture layer and the upper mixture layer is in the range of 1:9 to 4:6. Specifically, the thickness ratio of the lower mixture layer and the upper mixture layer is in the range of 1:9 to 3:7 or 2:8 to 3:7. The electrode for a secondary battery according to the present invention includes a structure in which a double-layered mixture layer is formed on one or both surfaces of a current collector. In the present invention, the thickness of the lower mixture layer is formed to be thinner than the thickness of the upper mixture layer. The upper mixture layer serves to increase the energy density of the electrode, and the lower mixture layer serves to protect the current collector during rolling.

In yet another embodiment, the current collector layer has an average thickness of 10 to 20 μm. Specifically, the average thickness of the current collector layer is preferably in the range of 10 to 15 μm, or in the range of 13 to 18 μm. By controlling the thickness of the current collector layer within the above range, it is possible to minimize the volume of forming the current collector while preventing a decrease in mechanical strength.

In another embodiment, the method of manufacturing an electrode for a secondary battery further includes forming a buffer layer including an oxide containing niobium on the current collector before forming the lower mixture layer.

In an embodiment, the oxide containing niobium contained in the buffer layer includes at least one of $Li_3NbO_4$, $LiNbO$, and $Nb_2O_5$. Specifically, in the step of forming the buffer layer, the average thickness of the formed buffer layer is in the range of 1 to 10 μm.

Hereinafter, the present invention will be described in more detail through examples. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

EXAMPLES AND COMPARATIVE EXAMPLES

Example 1

100 parts by weight of NCM ($LiNi_{0.8}Co_{0.1}Mn_{0.1}O_2$) as a positive electrode active material, 1.5 parts by weight of carbon black (FX35, Denka, spherical, average diameter (D50) 15 to 40 nm) as a conductive material, and 3.5 parts by weight of polyvinylidene fluoride (KF9700, Kureha) as a binder polymer were added to NMP (N-methyl-2-pyrrolidone) as a solvent to prepare a slurry for the lower mixture layer. The positive electrode active material is a mixture of an active material having an average particle diameter of 11 μm and an active material having an average particle diameter of 6 μm in a ratio of 80:20 parts by weight. 100 parts by weight of NCM ($LiNi_{0.8}Co_{0.1}Mn_{0.1}O_2$) as a positive electrode active material, 1.5 parts by weight of carbon black (FX35, Denka, spherical, average diameter (D50) 15 to 40 nm) as a conductive material, and 3.5 parts by weight of polyvinylidene fluoride (KF9700, Kureha) as a binder polymer were added to NMP (N-methyl-2-pyrrolidone) as a solvent to prepare a slurry for the upper mixture layer. The positive electrode active material is a mixture of an active material having an average particle diameter of 15 μm and an active material having an average particle diameter of 6 μm in a ratio of 80:20 parts by weight.

The slurry for the lower mixture layer was coated to a thickness of 15 μm on both sides of an aluminum foil having an average thickness of 18 μm, and the slurry for the upper mixture layer was coated to a thickness of 105 μm, followed by drying. The positive electrode was manufactured by rolling the electrode including the mixture layer.

100 parts by weight of artificial graphite (GT, Zichen (China)) as a negative electrode active material, 1.1 parts by weight of carbon black (Super-P) as a conductive material, 2.2 parts by weight of styrene-butadiene rubber, and 0.7 parts by weight of carboxy methyl cellulose to water were added to water as a solvent to prepare a negative electrode active material, and was then coated, dried and pressed on a cooper current collector, to thereby manufacture a negative electrode.

On the other hand, polypropylene was uniaxially stretched using a dry method to prepare a separator having a microporous structure having a melting point of 165° C. and a width of 200 mm on one side. An electrode assembly having a structure in which a separator is interposed between the positive electrode and the negative electrode was manufactured. After the electrode assembly was built into a pouch-type battery case, a 1M $LiPF_6$ carbonate-based solution electrolyte was injected to prepare a secondary battery.

Figure 1:
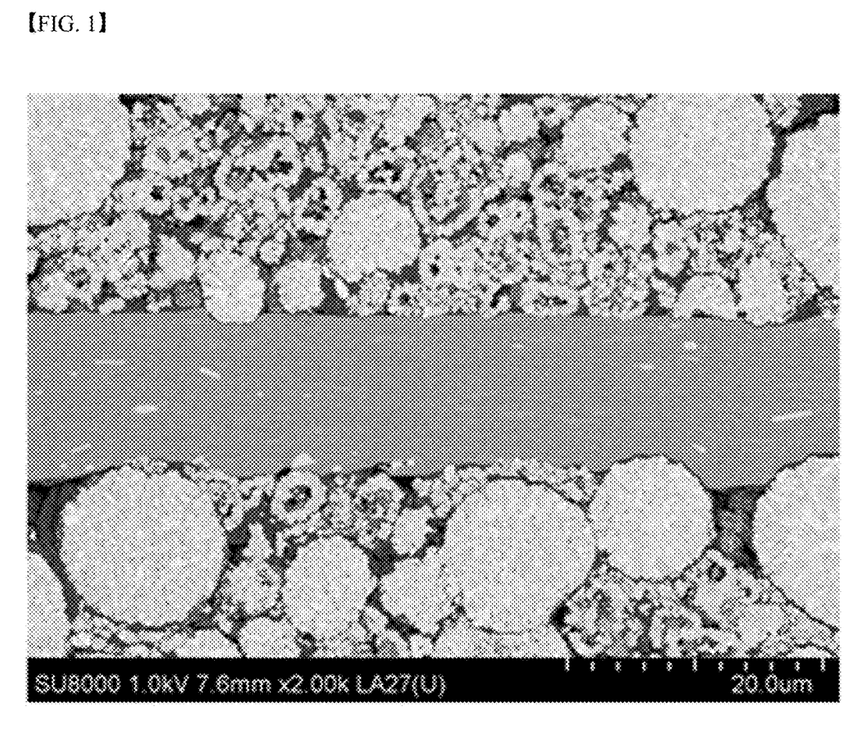
FIG. 1 is an electron microscope photograph showing a cross-sectional structure of an electrode according to an embodiment of the present invention.

The cross-sectional structure of the positive electrode is shown in FIG. 1. Specifically, FIG. 1 is a cross-sectional structure of a positive electrode that has undergone a rolling process for the electrode. Referring to FIG. 1, the electrode according to the present embodiment is a positive electrode for a secondary battery, and lower and upper mixture layers are sequentially stacked on a current collector layer formed of an aluminum foil. In this embodiment, it can be seen that the surface of the current collector is relatively very flat. This minimizes damage to the current collector by performing the role of a kind of buffer layer on the lower mixture layer. Although some active material particles were partially incorporated into the surface of the current collector, it can be seen that the degree of inclusion is very low, and the thickness of the current collector is maintained almost uniformly.

Example 2

A slurry for a positive electrode mixture layer was prepared in the same manner as in Example 1, except that an active material having an average particle diameter of 11 μm and an active material having an average particle diameter of 6 μm as positive electrode active materials were mixed in a ratio of 70:30 parts by weight to prepare a slurry for the lower mixture layer, and an active material having an average particle diameter of 15 μm and an active material having an average particle diameter of 6 μm as positive electrode active materials were mixed in a ratio of 70:30 parts by weight to prepare a slurry for the upper mixture layer.

The slurry for the lower mixture layer was coated to a thickness of 30 μm on both sides of the aluminum foil, and the slurry for the upper mixture layer was coated to a thickness of 90 μm, followed by drying. The positive electrode was manufactured by rolling the electrode including the mixture layer.

A secondary battery was manufactured in the same manner as in Example 1 except for the configuration and processes of the positive electrode.

Example 3

A slurry for a positive electrode mixture layer was prepared in the same manner as in Example 1, except that an active material having an average particle diameter of 11 μm and an active material having an average particle diameter of 6μm as positive electrode active materials were mixed in a ratio of 60:40 parts by weight to prepare a slurry for the lower mixture layer, and an active material having an average particle diameter of 15 μm and an active material having an average particle diameter of 6 μm as positive electrode active materials were mixed in a ratio of 60:40 parts by weight to prepare a slurry for the upper mixture layer.

The slurry for the lower mixture layer was coated to a thickness of 40 μm on both sides of the aluminum foil, and the slurry for the upper mixture layer was coated to a thickness of 80 μm, followed by drying. The positive electrode was manufactured by rolling the electrode including the mixture layer.

A secondary battery was manufactured in the same manner as in Example 1 except for processes about the positive electrode.

Comparative Example 1

100 parts by weight of NCM (LiNi$_{0.8}$Co$_{0.1}$Mn$_{0.1}$O$_2$) as a positive electrode active material, 1.5 parts by weight of carbon black (FX35, Denka, spherical, average diameter (D50) 15 to 40 nm) as a conductive material, and 3.5 parts by weight of polyvinylidene fluoride (KF9700, Kureha) as a binder polymer were added to NMP (N-methyl-2-pyrrolidone) as a solvent to prepare a slurry for the mixture layer. The positive electrode active material is a mixture of an active material having an average particle diameter of 15 μm and an active material having an average particle diameter of 6 μm in a ratio of 70:30 parts by weight.

After coating the slurry for a mixture layer to a thickness of 120 μm on both sides of the aluminum foil, drying was performed. The positive electrode was manufactured by rolling the electrode including the mixture layer.

A secondary battery was manufactured in the same manner as in Example 1 except for processes about the positive electrode.

Figure 2:
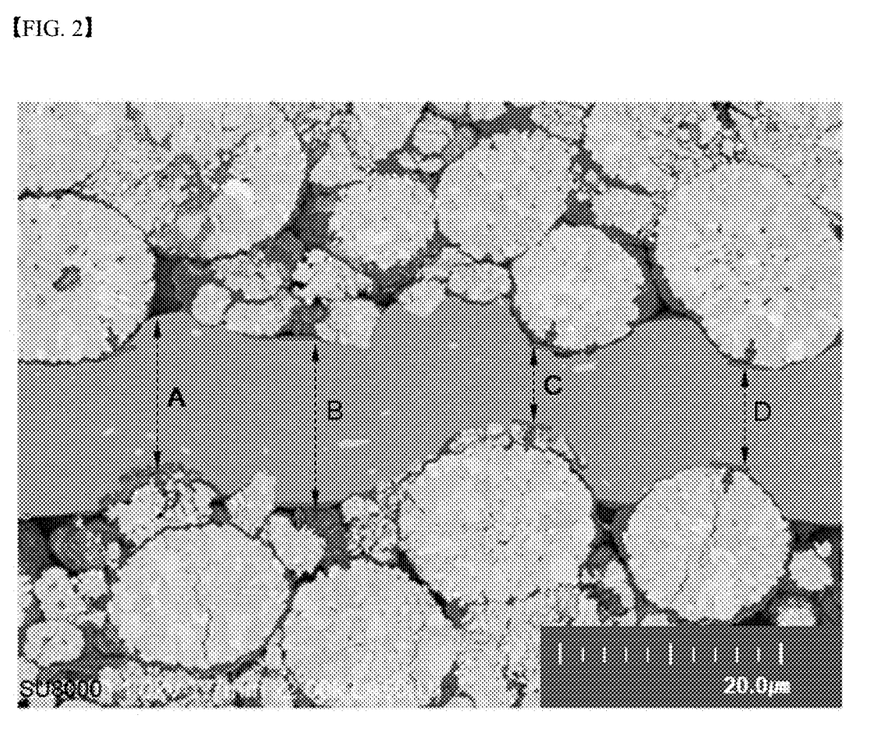
FIG. 2 is an electron microscope photograph showing a cross-sectional structure of an electrode according to a comparative example.

The cross-sectional structure of the positive electrode prepared in this comparative example is shown in FIG. 2. Referring to FIG. 2, the positive electrode for a secondary battery according to the present comparative example has a structure in which a mixture layer is stacked on both surfaces of a current collector layer formed of aluminum foil. The mixture layer has a form in which the large particle active material and the small particle active material are mixed, and the active material particles pressurize the current collector in the process of rolling the electrode. In this comparative example, in the process of pressing the mixture layer, it can be seen that the active material particles are partially incorporated into the current collector, and the degree is high.

Specifically, in the positive electrode of FIG. 2, the thickness of the current collector was measured at four points A, B, C, and D. As a result of the measurement, the thickness of point A was 9.68 μm, the thickness of point B was 10.10 μm, the thickness of point C was 6.19 μm, and the thickness of point D was 8.06 μm. Through this, it can be seen that the thickness of the current collector shown in FIG. 2 is very irregular for each region.

Comparative Example 2

100 parts by weight of NCM (LiNi$_{0.8}$Co$_{0.1}$Mn$_{0.1}$O$_2$) as a positive electrode active material, 1.5 parts by weight of carbon black (FX35, Denka, spherical, average diameter (D50) 15 to 40 nm) as a conductive material, and 3.5 parts by weight of polyvinylidene fluoride (KF9700, Kureha) as a binder polymer were added to NMP (N-methyl-2-pyrrolidone) as a solvent to prepare a slurry for the lower mixture layer. As the positive electrode active material, an active material having an average particle diameter of 6 μm was used.

100 parts by weight of NCM (LiNi$_{0.8}$Co$_{0.1}$Mn$_{0.1}$O$_2$) as a positive electrode active material, 1.5 parts by weight of carbon black (FX35, Denka, spherical, average diameter (D50) 15 to 40 nm) as a conductive material, and 3.5 parts by weight of polyvinylidene fluoride (KF9700, Kureha) as a binder polymer were added to NMP (N-methyl-2-pyrrolidone) as a solvent to prepare a slurry for the upper mixture layer. An active material having an average particle diameter of 15 μm was used as an electrode active material.

The slurry for the lower mixture layer was coated to a thickness of 30 μm on both sides of the aluminum foil, and the slurry for the upper mixture layer was coated to a thickness of 90 μm, followed by drying. The positive electrode was manufactured by rolling the electrode including the mixture layer.

A secondary battery was manufactured in the same manner as in Example 1 except for processes about the positive electrode.

Experimental Example 1

Life Evaluation

Figure 3:
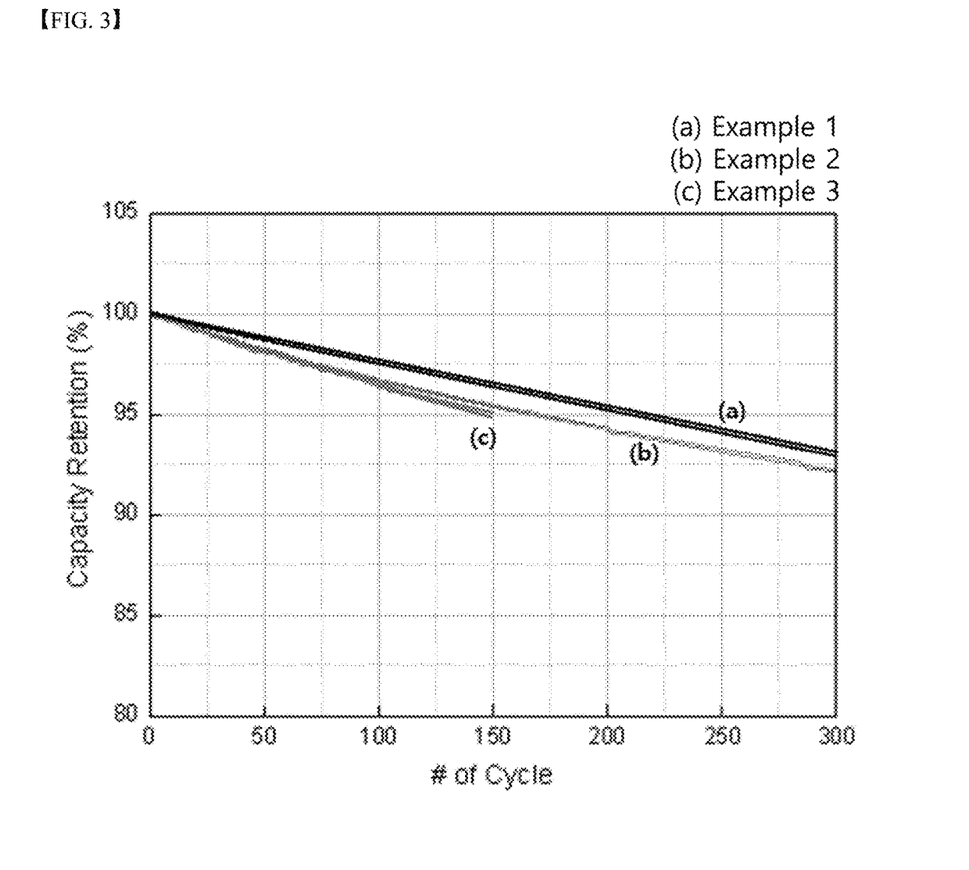
FIG. 3 is a graph showing the evaluation result of life characteristics for a secondary battery according to an embodiment of the present invention.
Figure 4:
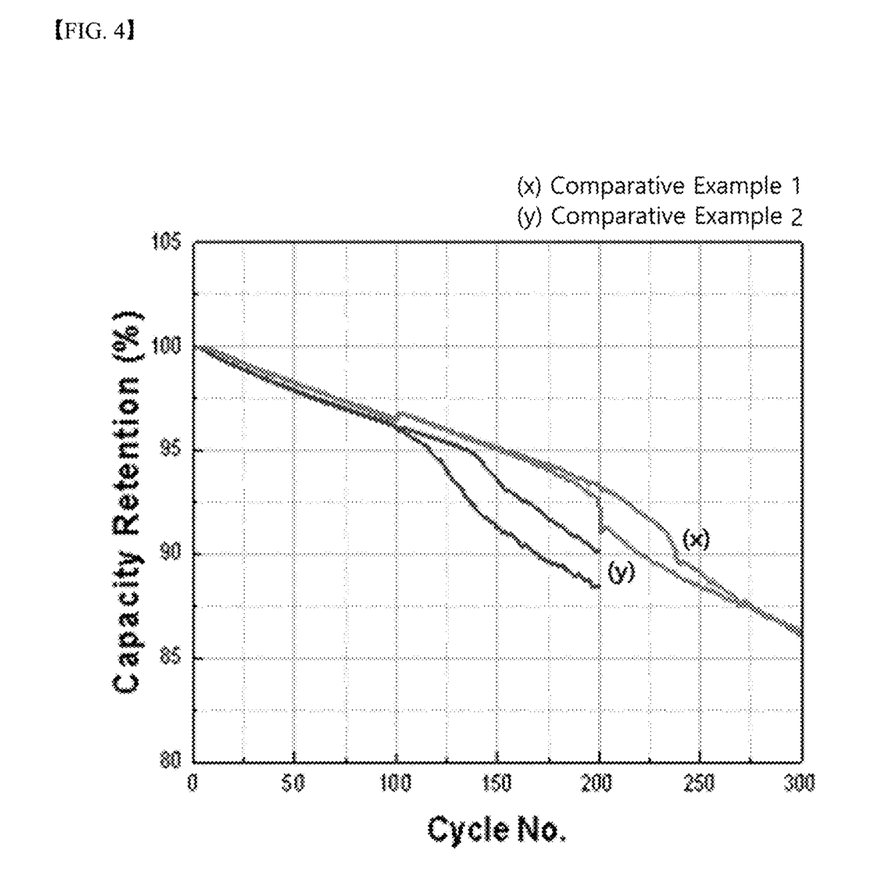
FIG. 4 is a graph showing evaluation results of life characteristics for a secondary battery according to a comparative example.

For the secondary batteries prepared in Examples 1 to 3 and Comparative Examples 1 and 2, the capacity retention rate according to charging and discharging was evaluated. The evaluation was carried out while the initial capacity was 100% and charging/discharging was performed at ⅓ C in a 45° C. chamber. The evaluation results are shown in FIGS. 3 and 4. FIG. 3 is an evaluation result of the secondary battery manufactured in Examples 1 to 3, and FIG. 4 is an evaluation result of the secondary battery manufactured in Comparative Examples 1 and 2.

Referring to FIG. 3, it was calculated that the secondary batteries prepared in Examples 1 to 3 had a capacity retention rate of 95% or more at the point of repeating the charge/discharge 150 cycles. In addition, when charging and discharging were repeated 250 cycles, the capacity retention rate of the secondary battery prepared in Example 1 was about 94%, and the capacity retention rate of the secondary battery prepared in Example 2 was about 93%.

On the other hand, referring to FIG. 4, the secondary battery manufactured in Comparative Example 1 has a capacity retention rate of about 95% at the time of repeating the charge/discharge 150 cycles, but the capacity retention rate is about 93% or less at the time when 200 cycles of charge/discharge were repeated, and falls to 89% or less at the time of repeating 250 cycles of charge/discharge. In addition, the secondary battery manufactured in Comparative Example 2 has a capacity retention rate of about 92 to 93% at the time of repeating the charge/discharge 150 cycles, and the capacity retention rate drops to about 90% or less at the time of repeating the charge/discharge 200 cycles.

Compared to the secondary batteries prepared in Examples 1 to 3, the capacity retention rate of the secondary batteries prepared in Comparative Examples 1 and 2 decreased more rapidly depending on the charge/discharge cycle, and in particular, the capacity retention rate sharply decreased when the number of times of charge/discharge passed 150 (Comparative Example 2) or 200 (Comparative Example 1).

Experimental Example 2

Measurement of Tensile Strength

For the positive electrodes prepared in Examples 1 to 3 and Comparative Examples 1 and 2, rolling density and tensile strength were measured.

First, the rolling density was calculated by measuring the porosity for each specimen. The same pressure was applied during electrode manufacturing, but it was confirmed that there was a difference in porosity measured for each sample.

For the measurement of tensile strength, a specimen was prepared by horizontally cutting the MD surface and the TD surface for each positive electrode prepared in Examples. The specimen was prepared in a size of 2 cm in width and 20 cm in length. Then, both ends of the specimen were pulled in parallel in the longitudinal direction while being fixed to the jig. The tensile speed was controlled at 20 cm/min, and the force (N) was calculated by measuring the F-D curve just before the specimen was disconnected. The measurement results are shown in Table 1 below.

TABLE 1

| Specimen No. | Porosity (%, v/v) | TD direction Tensile strength (N) | MD direction Tensile strength (N) |
|---|---|---|---|
| Example 1 | 25 | 19.7 | 18.9 |
| Example 2 | 24.6 | 20.1 | 19.5 |
| Example 3 | 24.1 | 21.9 | 20.5 |
| Comparative Example 1 | 23.5 | 19.1 | 18.1 |
| Comparative Example 2 | 26.1 | 18.9 | 18.0 |

Referring to Table 1, it was confirmed that the porosity of the specimen of Comparative Example 2 was not controlled to 25% or less. This means that the specimen of Comparative Example 2 should be rolled with a greater force in order to achieve an equivalent level of rolling density, and thus it can be predicted that the damage to the current collector will be greater. In the specimens of Examples 1 to 3, it was calculated that the tensile strength in the MD direction was 19.7 to 21.9 N, and the tensile strength in the TD direction was 18.9 to 20.5 N. On the other hand, it can be seen that the specimens of Comparative Examples 1 and 2 are lower than the specimens of Examples 1 to 3 in both MD and TD direction tensile strengths. This is, it is understood that the tensile strength of the specimens of Comparative Examples 1 and 2 has decreased due to damage to the aluminum foil applied to the current collector during the rolling process of the electrode.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

DESCRIPTION OF REFERENCE NUMERALS

A, B, C, D: thickness of each area of the current collector layer

The invention claimed is:

1. An electrode for a secondary battery, comprising:
a current collector layer;
a lower mixture layer disposed on one or both surfaces of the current collector layer and including a first active material; and
an upper mixture layer disposed on a surface of the lower mixture layer which is opposite to a surface of the lower mixture layer that comes in contact with the current collector layer, and including a second active material,
wherein the second active material includes particles having diameters within a first particle diameter range and particles having diameters within a third particle diameter range,
wherein the first active material includes particles having diameters within a second particle diameter range and particles having diameters within the third particle diameter range,
wherein following conditions 1 and 2 are satisfied:

$$D1 > D2 > D3 \quad \text{[Condition 1]}$$

$$D1 - D3 \geq 5 \ (\mu m) \quad \text{[Condition 2]}$$

wherein in the conditions 1 and 2,
D1 is an average particle diameter of the particles having diameters within the first particle diameter range,
D2 is an average particle diameter of the particles having diameters within the second particle diameter range, and
D3 is an average particle diameter of the particles having diameters within the third particle diameter range, and
wherein in the upper mixture layer, a content ratio of the particles having diameters within the first particle diameter range to the particles having diameters within the third particle diameter range is in a range of 6:4 to 9:1 by weight, and
a concentration of the particles having diameters within the first particle diameter range is higher in the upper mixture layer than in the lower mixture layer.

2. The electrode of claim 1, wherein the average particle diameter of the particles having diameters within the first particle diameter range is in a range of 14 to 20 μm,
wherein the average particle diameter of the particles having diameters within the second particle diameter range is in a range of 10 to 13 μm, and
wherein the average particle diameter of the active material particles having diameters within the third particle diameter range is in a range of 3 to 9 μm.

3. The electrode of claim 1, wherein in the lower mixture layer, a content ratio of the particles having diameters within the second particle size range to the particles having diameters within the third particle size range is in a range of 6:4 to 9:1 by weight.

4. The electrode of claim 1, further comprising: a buffer layer interposed between the current collector layer and the lower mixture layer, wherein the buffer layer contains a niobium-containing oxide.

5. The electrode of claim 4, wherein the niobium-containing oxide contained in the buffer layer includes at least one of $Li_3NbO_4$, $LiNbO$, or $Nb_2O_5$.

6. The electrode of claim 4, wherein an average thickness of the buffer layer is in a range of 1 to 10 μm.

7. The electrode of claim 1, wherein the current collector layer comprises a metal foil having an average thickness of 10 to 20 μm.

8. The electrode of claim 1, wherein the electrode is for a lithium secondary battery.

9. A method of manufacturing an electrode for a secondary battery, comprising:
forming a lower mixture layer on one or both sides of a current collector layer, and including active material containing particles having diameters within a second particle diameter range and particles having diameters within a third particle diameter range;

forming an upper mixture layer on the lower mixture layer, and including active material containing particles having diameter within a first particle diameter range and particles having diameter within the third particle diameter range; and rolling the electrode on which the lower and upper mixture layers are applied, wherein following conditions 1 and 2 are satisfied:

$$D1 > D2 > D3 \quad \text{[Condition 1]}$$

$$D1 - D3 \geq 5 \ (\mu m) \quad \text{[Condition 2]}$$

wherein in the conditions 1 and 2,

D1 is an average particle diameter of the particles having diameters within the first particle diameter range, D2 is an average particle diameter of the particles having diameters within the second particle diameter range, and D3 is an average particle diameter of the particles having diameters within the third particle diameter range, wherein in the upper mixture layer, a content ratio of the particles having diameters within the first particle diameter range to the particles having diameters within the third particle diameter range is in a range of 6:4 to 9:1 by weight, and a concentration of the particles having diameters within the first particle diameter range is higher in the upper mixture layer than in the lower mixture layer.

10. The method of claim 9, wherein a porosity of the first and second mixture layers after the rolling is in a range of 20 to 30% (v/v).

11. The method of claim 9, wherein a thickness ratio of the lower mixture layer to the upper mixture layer is in a range of 1:9 to 4:6.

12. The method of claim 9, wherein the current collector layer comprises a metal foil having an average thickness of 10 to 20 μm.

13. The method of claim 9, further comprising: forming a buffer layer containing an oxide containing niobium on the current collector before the lower mixture layer is formed.

14. The electrode of claim 1, wherein in the upper mixture layer, the content ratio of the particles having diameters within the first particle diameter range to the particles having diameters within the third particle diameter range is in a range of 7:3 to 8:2 by weight.

15. The electrode of claim 1, wherein in the lower mixture layer, a content ratio of the particles having diameters within the second particle size range to the particles having diameters within the third particle size range is in a range of 7:3 to 8:2 by weight.

16. The method of claim 9, wherein in the upper mixture layer, the content ratio of the particles having diameters within the first particle diameter range to the particles having diameters within the third particle diameter range is in a range of 7:3 to 8:2 by weight.

17. The method of claim 9, wherein in the lower mixture layer, a content ratio of the particles having diameters within the second particle size range to the particles having diameters within the third particle size range is in a range of 6:4 to 9:1 by weight.

18. The method of claim 9, wherein in the lower mixture layer, a content ratio of the particles having diameters within the second particle size range to the particles having diameters within the third particle size range is in a range of 7:3 to 8:2 by weight.

19. An electrode for a secondary battery, comprising:

a current collector layer;

a lower mixture layer disposed on one or both surfaces of the current collector layer and including a first active material; and an upper mixture layer disposed on a surface of the lower mixture layer which is opposite to a surface of the lower mixture layer that comes in contact with the current collector layer, and including a second active material; and a buffer layer interposed between the current collector layer and the lower mixture layer, wherein the buffer layer contains a niobium-containing oxide, wherein the second active material includes particles having diameters within a first particle diameter range and particles having diameters within a third particle diameter range, wherein the first active material includes particles having diameters within a second particle diameter range and particles having diameters within the third particle diameter range, wherein following conditions 1 and 2 are satisfied:

$$D1 > D2 > D3 \quad \text{[Condition 1]}$$

$$D1 - D3 \geq 5 \ (\mu m) \quad \text{[Condition 2]}$$

wherein in the conditions 1 and 2,

D1 is an average particle diameter of the particles having diameters within the first particle diameter range, D2 is an average particle diameter of the particles having diameters within the second particle diameter range, and D3 is an average particle diameter of the active material particles having diameters within the third particle diameter range, and wherein in the upper mixture layer, a content ratio of the particles having diameters within the first particle diameter range to the particles having diameters within the third particle diameter range is in a range of 6:4 to 9:1 by weight.

* * * * *